(12) United States Patent
Hwangbo

(10) Patent No.: US 11,117,540 B2
(45) Date of Patent: Sep. 14, 2021

(54) ROOF AIRBAG APPARATUS

(71) Applicant: HYUNDAI MOBIS CO., LTD., Seoul (KR)

(72) Inventor: Sang Won Hwangbo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/921,313

(22) Filed: Jul. 6, 2020

(65) Prior Publication Data

US 2021/0009072 A1 Jan. 14, 2021

(30) Foreign Application Priority Data

Jul. 8, 2019 (KR) .................. 10-2019-0082005

(51) Int. Cl.
| | |
|---|---|
| *B60R 21/214* | (2011.01) |
| *B60R 21/015* | (2006.01) |
| *B60R 21/2338* | (2011.01) |
| *B60R 21/261* | (2011.01) |
| *B60R 21/233* | (2006.01) |
| *B60R 21/231* | (2011.01) |

(52) U.S. Cl.
CPC ...... *B60R 21/214* (2013.01); *B60R 21/01512* (2014.10); *B60R 21/233* (2013.01); *B60R 21/2338* (2013.01); *B60R 21/261* (2013.01); *B60R 2021/23107* (2013.01); *B60R 2021/23192* (2013.01); *B60R 2021/23382* (2013.01)

(58) Field of Classification Search
CPC ............ B60R 21/214; B60R 21/01512; B60R 21/2338; B60R 21/261; B60R 21/233; B60R 2021/23107; B60R 2021/23192; B60R 2021/23382; B60R 2021/23324; B60R 2021/23384; B60R 2021/23161; B60R 21/231

See application file for complete search history.

(56) References Cited

U.S. PATENT DOCUMENTS

| | | | | |
|---|---|---|---|---|
| 2017/0282841 A1* | 10/2017 | Hayashi | ................ | B60R 21/276 |
| 2019/0241148 A1* | 8/2019 | Shin | .................... | B60R 21/2338 |
| 2020/0017058 A1* | 1/2020 | Jaradi | ................... | B60R 21/233 |
| 2020/0139923 A1* | 5/2020 | Ostling | ................ | B60R 21/231 |
| 2020/0223387 A1* | 7/2020 | Min | .................... | B60R 21/2338 |
| 2020/0361410 A1* | 11/2020 | Jayakar | ............ | B60R 21/01554 |
| 2021/0031718 A1* | 2/2021 | Schultz | ................ | B60R 21/231 |

FOREIGN PATENT DOCUMENTS

| | | | | | |
|---|---|---|---|---|---|
| KR | 20210009121 A | * | 1/2021 | .......... | B60R 21/213 |
| WO | WO-2019168579 A1 | * | 9/2019 | .......... | B60R 21/214 |
| WO | WO-2019169209 A1 | * | 9/2019 | .......... | B60R 21/232 |
| WO | WO-2019209442 A1 | * | 10/2019 | .......... | B60R 21/232 |

* cited by examiner

*Primary Examiner* — Drew J Brown
(74) *Attorney, Agent, or Firm* — NovoTechIP International PLLC

(57) ABSTRACT

A roof airbag apparatus according to the present disclosure includes: an airbag main body which is deployed from a roof of a vehicle by gas generated by an inflator part when the vehicle collides; a tether operation part which is mounted to the airbag main body, and has a tether; and an auxiliary airbag which is connected to the airbag main body, and deployed from the airbag main body when the connection with the tether is released.

19 Claims, 13 Drawing Sheets

ROOF AIRBAG APPARATUS

This application claims priority from and the benefit of Korean Patent Application No. 10-2019-0082005, filed on Jul. 8, 2019, which is hereby incorporated by reference for all purposes as if set forth herein.

BACKGROUND

Field

The present disclosure relates to a roof airbag apparatus, and more particularly, to a roof airbag apparatus capable of preventing collision between passengers who are seated facing each other in an autonomous traveling vehicle.

Discussion of the Background

A roof airbag apparatus is an apparatus in which an airbag is deployed downward from a roof of a vehicle. Recently, research and development on an autonomous traveling vehicle has been actively conducted. In accordance with the era of the autonomous traveling vehicle, there is a need for an airbag apparatus capable of responding to various seat locations of the vehicle.

The roof airbag is deployed to prevent collision between passengers who are seated facing each other inside the vehicle. At this time, if a distance between the upper bodies of the passengers is long, it is necessary to inflate the volume of a cushion excessively.

In addition, when the passengers are seated facing each other, an airbag loading time difference occurs due to a difference in the behaviors of the front and rear passengers if there occurs collision or forward collision ahead of or behind the vehicle. Accordingly, there is a problem in that the cushion is not supported and is shaken, thereby degrading passenger protection performance. Accordingly, there is a need to alleviate the problem.

SUMMARY

The present disclosure is intended to solve the above problem, and an object of the present disclosure is to provide a roof airbag apparatus capable of preventing collision between passengers who are seated facing each other in an autonomous traveling vehicle.

A roof airbag apparatus according to an exemplary embodiment of the present disclosure includes: a first seat which has a first sensor sensing whether a first passenger is seated; a second seat which is disposed to face the first seat, and has a second sensor sensing whether a second passenger is seated; an airbag main body which is deployed between the first seat and the second seat downward from a roof of a vehicle by gas generated from an inflator part when the vehicle collides; an auxiliary airbag which is deployed downward from the airbag main body; a tether operation part which is mounted inside the airbag main body, has one end connected to a tether connected to the auxiliary airbag, and releases the connection with the tether; and a controller which receives information measured by the first sensor and the second sensor, and controls whether the tether operation part releases the connection with the tether.

In the present disclosure, the auxiliary airbag is deployed, when the tether operation part releases the connection with the tether.

In the present disclosure, a lower side of the airbag main body is deployed toward the first seat and the second seat compared to an upper side of the airbag main body, while being deployed downward from the roof.

In the present disclosure, a maximum width at which the auxiliary airbag is deployed toward the first seat and the second seat is formed smaller than a maximum width at which the airbag main body is deployed toward the first seat and the second seat.

In the present disclosure, the roof airbag apparatus further includes: a diaphragm part which is disposed between the airbag main body and the auxiliary airbag, and restricts a gas transfer of the inflator part from the airbag main body to the auxiliary airbag.

In the present disclosure, the diaphragm part is formed with a communication part through which the gas of the inflator part is discharged from the airbag main body to the auxiliary airbag.

In the present disclosure, the tether is connected to the auxiliary airbag through the communication part.

In the present disclosure, the auxiliary airbag accommodates the diaphragm part, and is sealed and fixed to the airbag main body with a separate material.

In the present disclosure, the controller receives information indicating that the first passenger and the second passenger are seated on the first seat and the second seat, respectively, and separation distance information between the first seat and the second seat from the first sensor and the second sensor, and allows the tether operation part to release the connection with the tether.

In the present disclosure, the tether operation part releases the connection with the tether when the first seat and the second seat are spaced apart from each other by a set distance or more.

A roof airbag apparatus according to another exemplary embodiment of the present disclosure includes: a first seat which has a first sensor sensing whether a first passenger is seated; a second seat which is disposed to face the first seat, and has a second sensor sensing whether a second passenger is seated; an airbag main body which is deployed between the first seat and the second seat downward from a roof of a vehicle by gas generated from an inflator part when the vehicle collides; a tether operation part which is mounted inside the airbag main body, has one end connected to a tether connected to the lower side of the airbag main body, and releases the connection with the tether; and a controller which receives information measured by the first sensor and the second sensor, and controls whether the tether operation part releases the connection with the tether, in which the airbag main body has an auxiliary airbag which is formed at the lower side of the airbag main body, and is deployed downward from the airbag main body, when the tether operation part releases the connection with the tether.

In the present disclosure, a lower side of the airbag main body is deployed toward the first seat and the second seat compared to an upper side of the airbag main body, while being deployed downward from the roof.

In the present disclosure, a maximum width at which the auxiliary airbag is deployed toward the first seat and the second seat is formed smaller than a maximum width at which the airbag main body is deployed toward the first seat and the second seat.

In the present disclosure, the airbag main body includes: a main cushion part which is mounted with the tether operation part, and inflated toward the first seat and the second seat; and one or more side cushions which are mounted to one surface and the other surface of the main cushion part which are opened, respectively, and have the auxiliary airbag at one side thereof.

In the present disclosure, the airbag main body further includes: a diaphragm part which is disposed between the main cushion part and the auxiliary airbag, and restricts a gas transfer of the inflator part from the main cushion part to the auxiliary airbag.

In the present disclosure, the diaphragm part is formed with a communication part through which the gas of the inflator part is discharged from the main cushion part to the auxiliary airbag.

In the present disclosure, the tether is connected to the auxiliary airbag through the communication part.

In the present disclosure, the controller receives information indicating that the first passenger and the second passenger are seated on the first seat and the second seat, respectively, and separation information between the first seat and the second seat from the first sensor and the second sensor, and allows the tether operation part to release the tether.

In the present disclosure, the tether operation part releases the connection with the tether when the first seat and the second seat are spaced apart from each other by a set distance or more.

According to the roof airbag apparatus according to the present disclosure, the airbag main body and the auxiliary airbag may be deployed between the passengers who are seated facing each other in the autonomous traveling vehicle, thereby reducing the occurrence of the injury caused by the collision between the passengers.

In addition, according to the present disclosure, the airbag main body and the auxiliary airbag may be deployed between the passengers who are seated facing each other in the autonomous traveling vehicle, thereby protecting the passengers from objects flying to the front of the passengers.

In addition, according to the present disclosure, the auxiliary airbag deployed downward from the airbag main body between the passengers who are seated facing each other may be deployed between the passengers who are seated facing each other, thereby improving passenger protection performance while minimizing the movement of the airbag main body.

DETAILED DESCRIPTION OF THE ILLUSTRATED EMBODIMENTS

Figure 1:
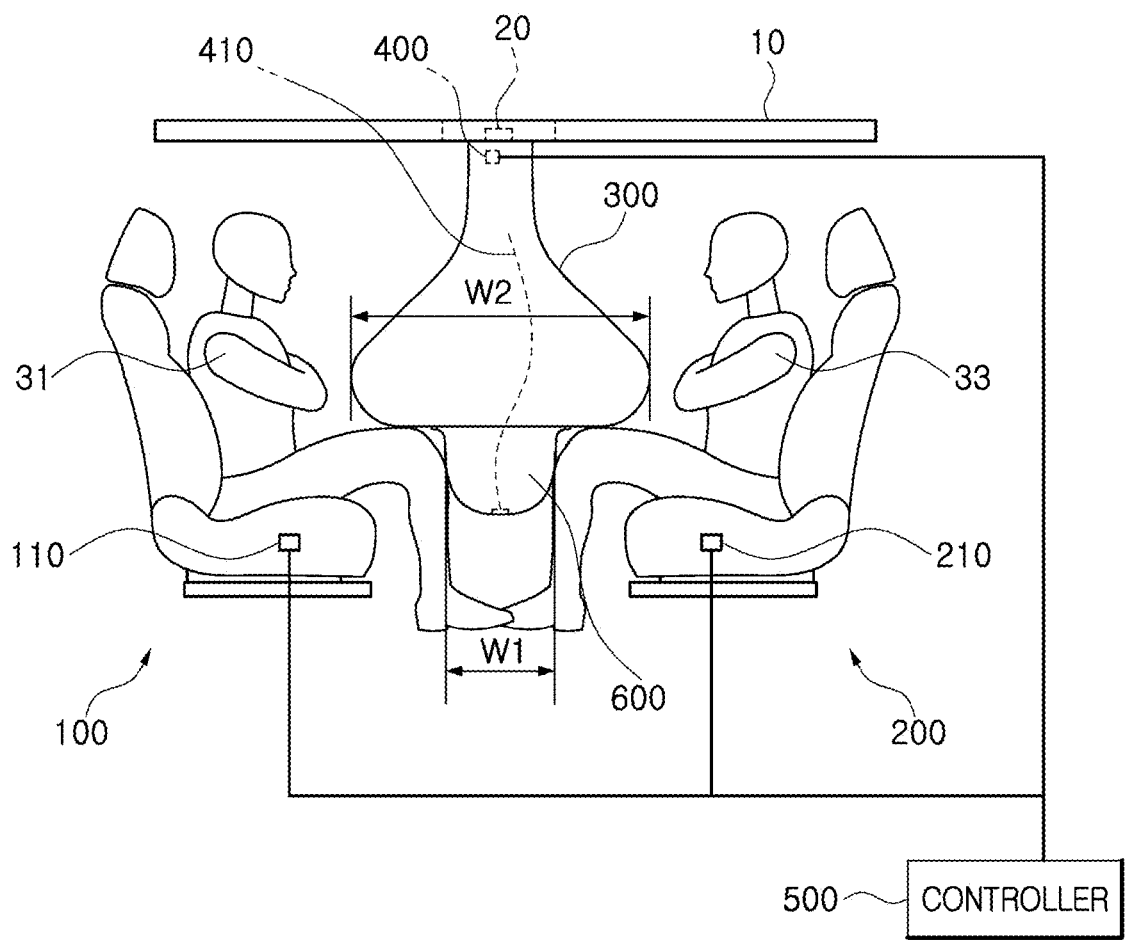
FIG. 1 is a conceptual diagram schematically illustrating a roof airbag apparatus according to an exemplary embodiment of the present disclosure.

Hereinafter, an exemplary embodiment of a roof airbag apparatus according to the present disclosure will be described with reference to the accompanying drawings. In this process, the thickness of the lines, the size of components, or the like illustrated in the drawings may be exaggerated for clarity and convenience of the description.

In addition, terms to be described later are terms defined in consideration of functions in the present disclosure, and may vary according to a user's or operator's intention or practice. Accordingly, the definition of these terms should be made based on the contents throughout the specification.

Figure 2:
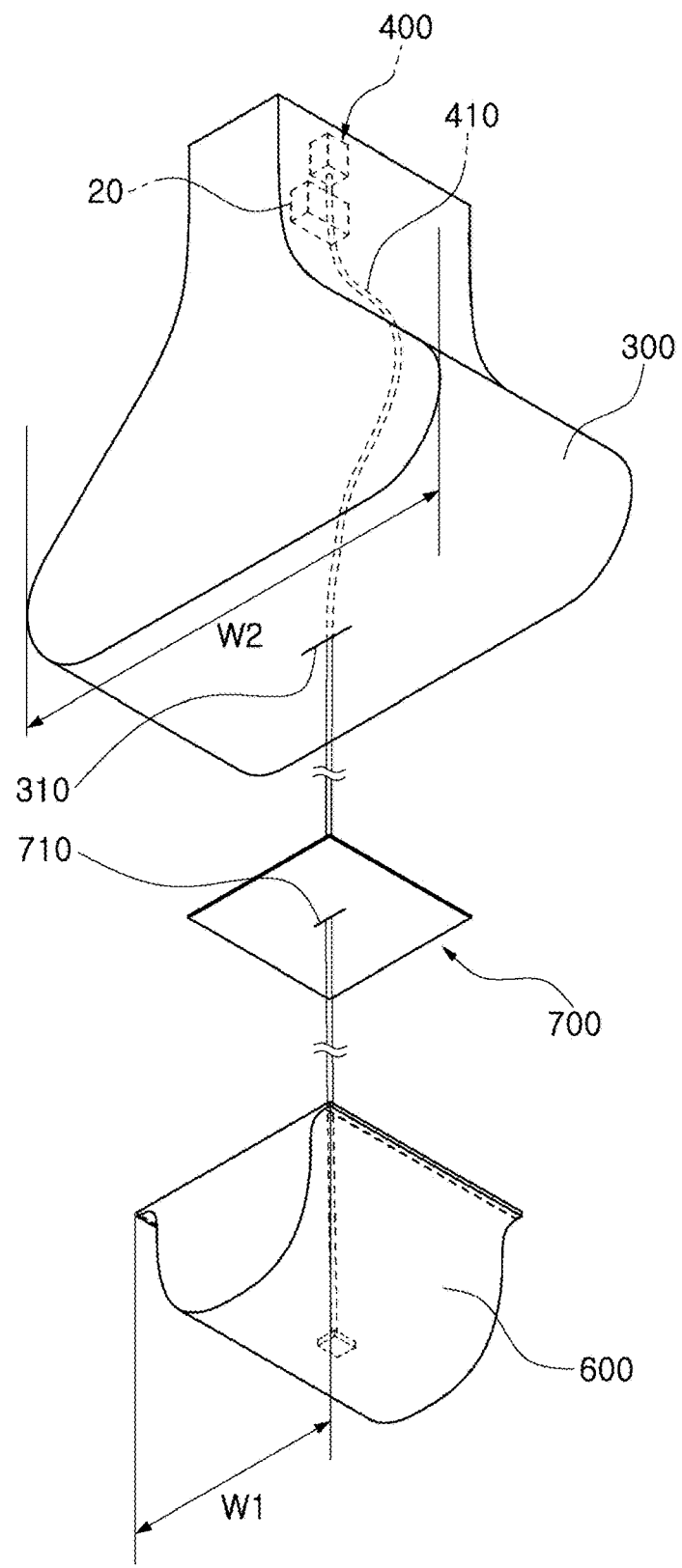
FIG. 2 is an assembly perspective diagram schematically illustrating the roof airbag apparatus according to the exemplary embodiment of the present disclosure.
Figure 3:
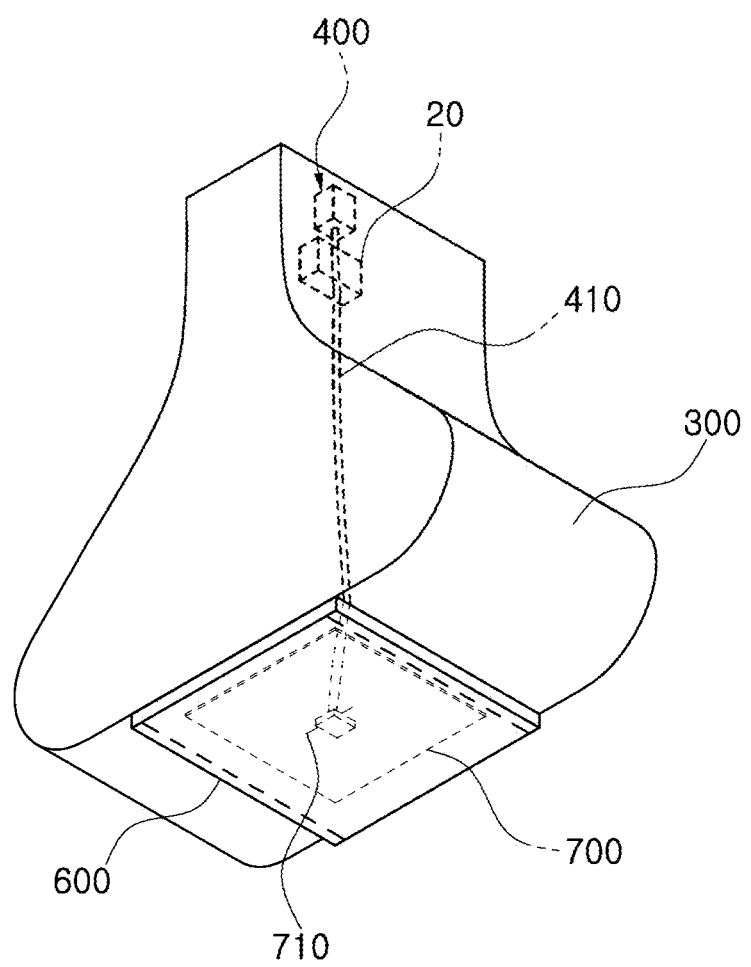
FIG. 3 is a bottom perspective diagram schematically illustrating the roof airbag apparatus according to the exemplary embodiment of the present disclosure.
Figure 4:
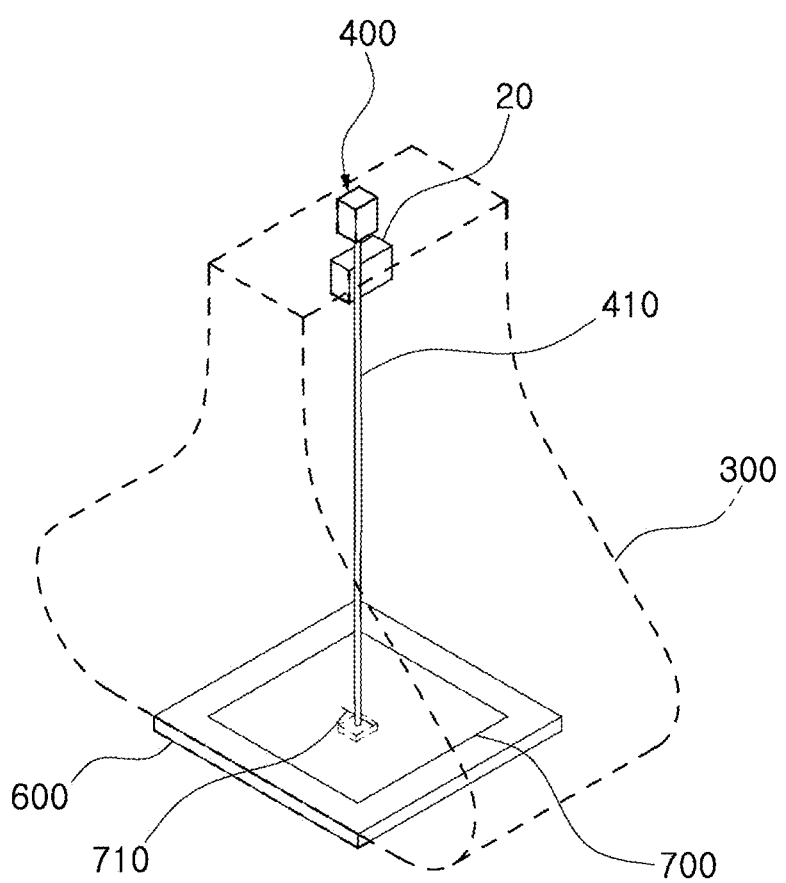
FIG. 4 is a perspective diagram schematically illustrating the roof airbag apparatus according to the exemplary embodiment of the present disclosure.
Figure 5:
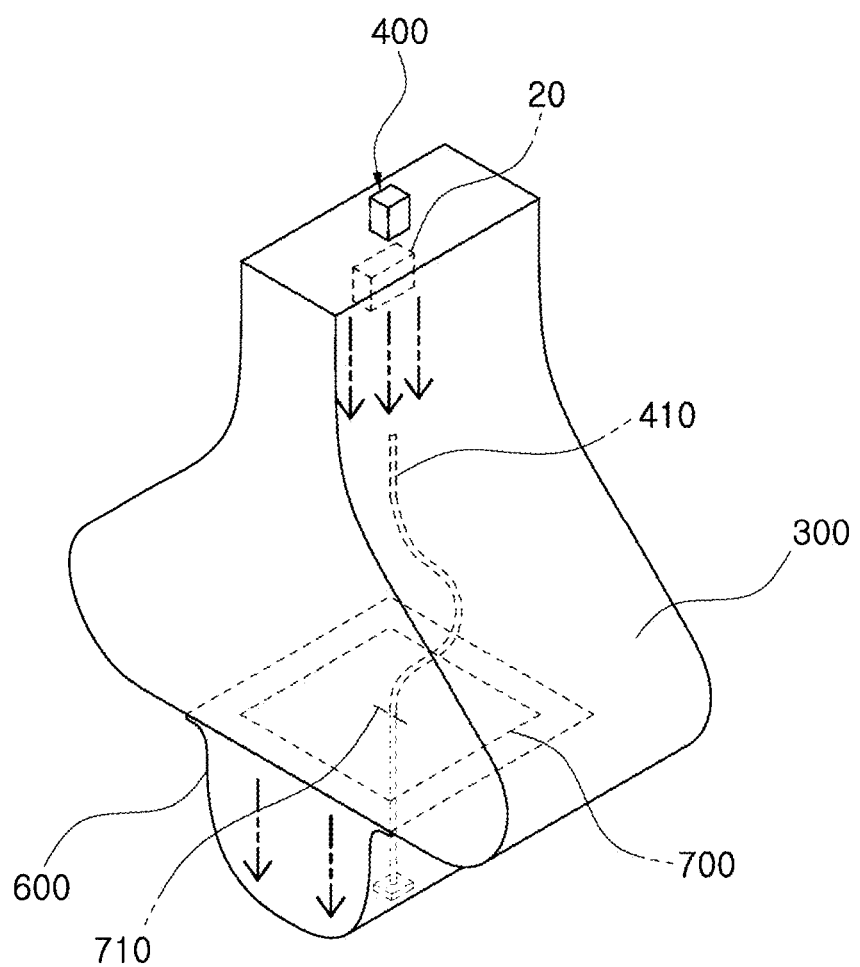
FIG. 5 is a perspective diagram schematically illustrating the deployment of an auxiliary airbag when a tether is released from a tether operation part in the roof airbag apparatus according to the exemplary embodiment of the present disclosure.
Figure 6:
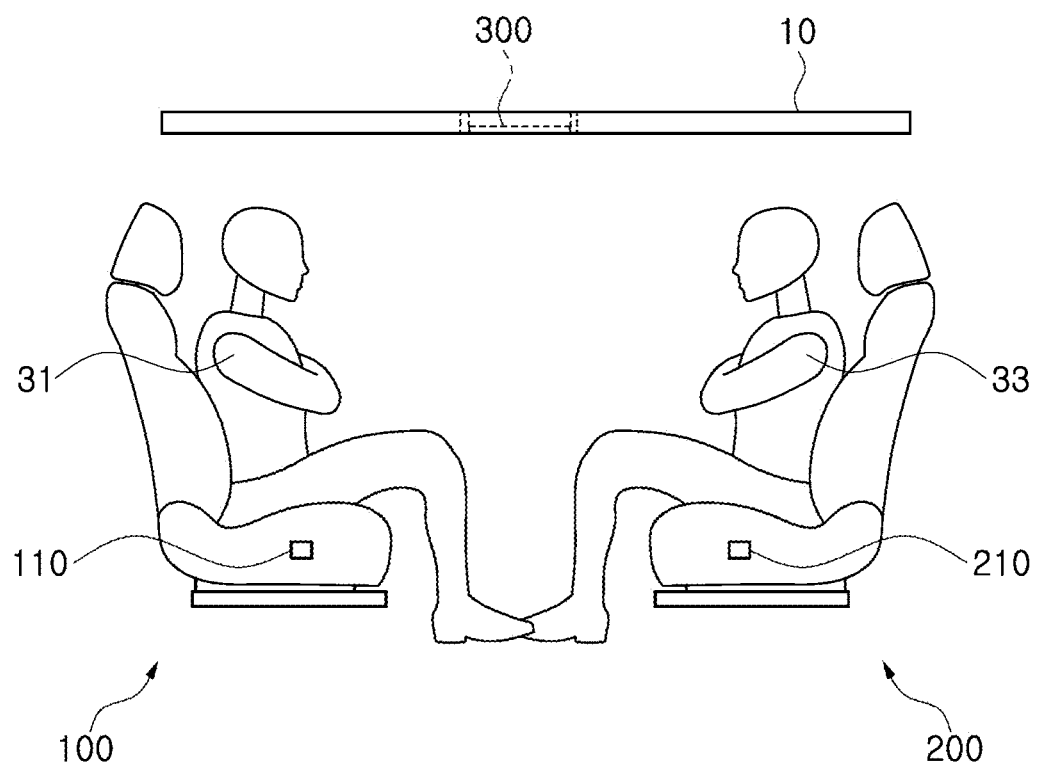
FIG. 6 is a conceptual diagram schematically illustrating that passengers are seated facing each other in a vehicle to which the roof airbag apparatus according to the exemplary embodiment of the present disclosure is mounted.
Figure 7:
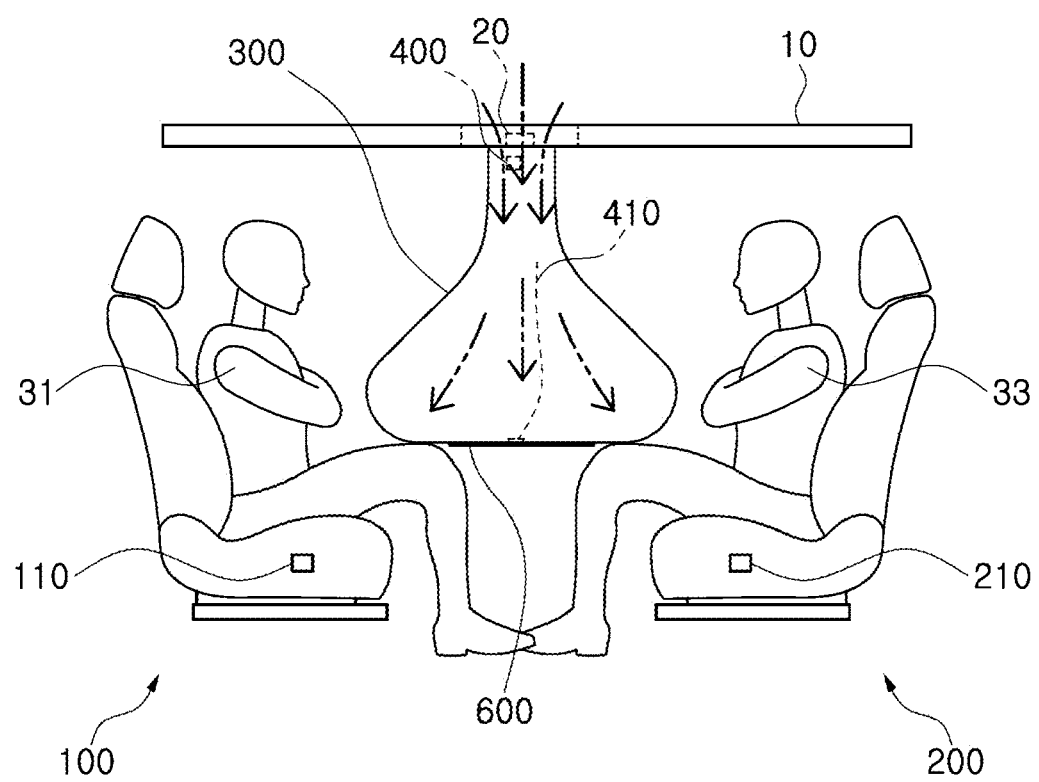
FIG. 7 is an operational diagram schematically illustrating that an airbag main body is deployed in the roof airbag apparatus according to the exemplary embodiment of the present disclosure.
Figure 8:
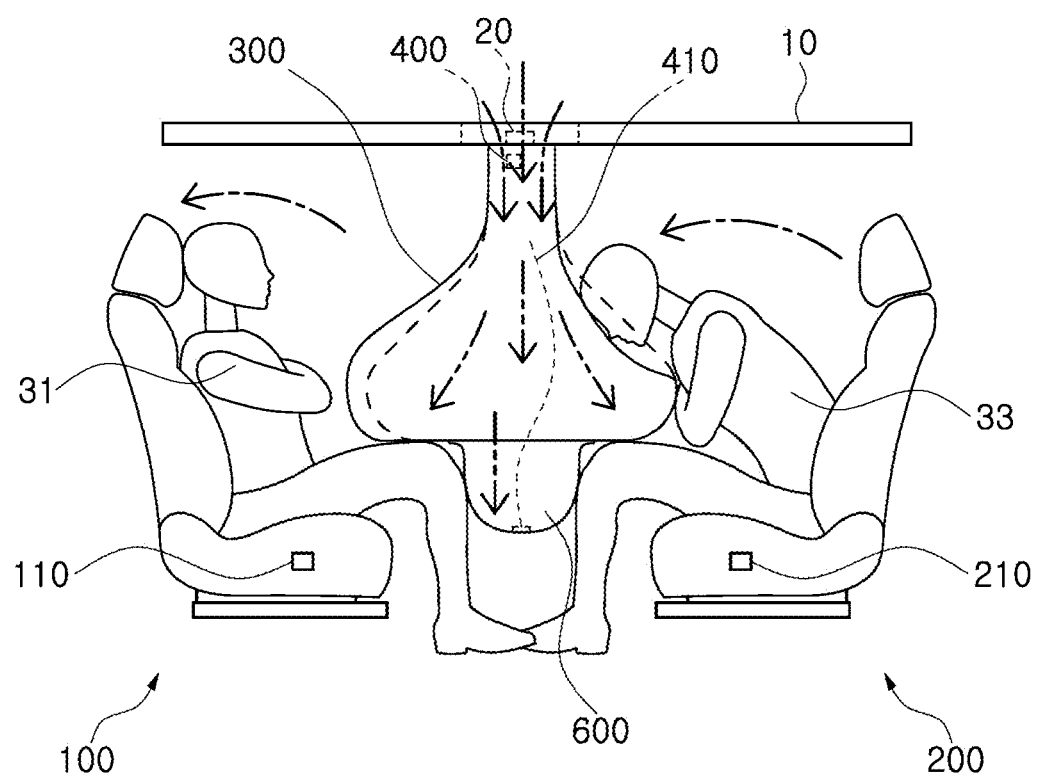
FIG. 8 is an operational diagram schematically illustrating that the auxiliary airbag is deployed in the roof airbag apparatus according to the exemplary embodiment of the present disclosure.
Figure 9:
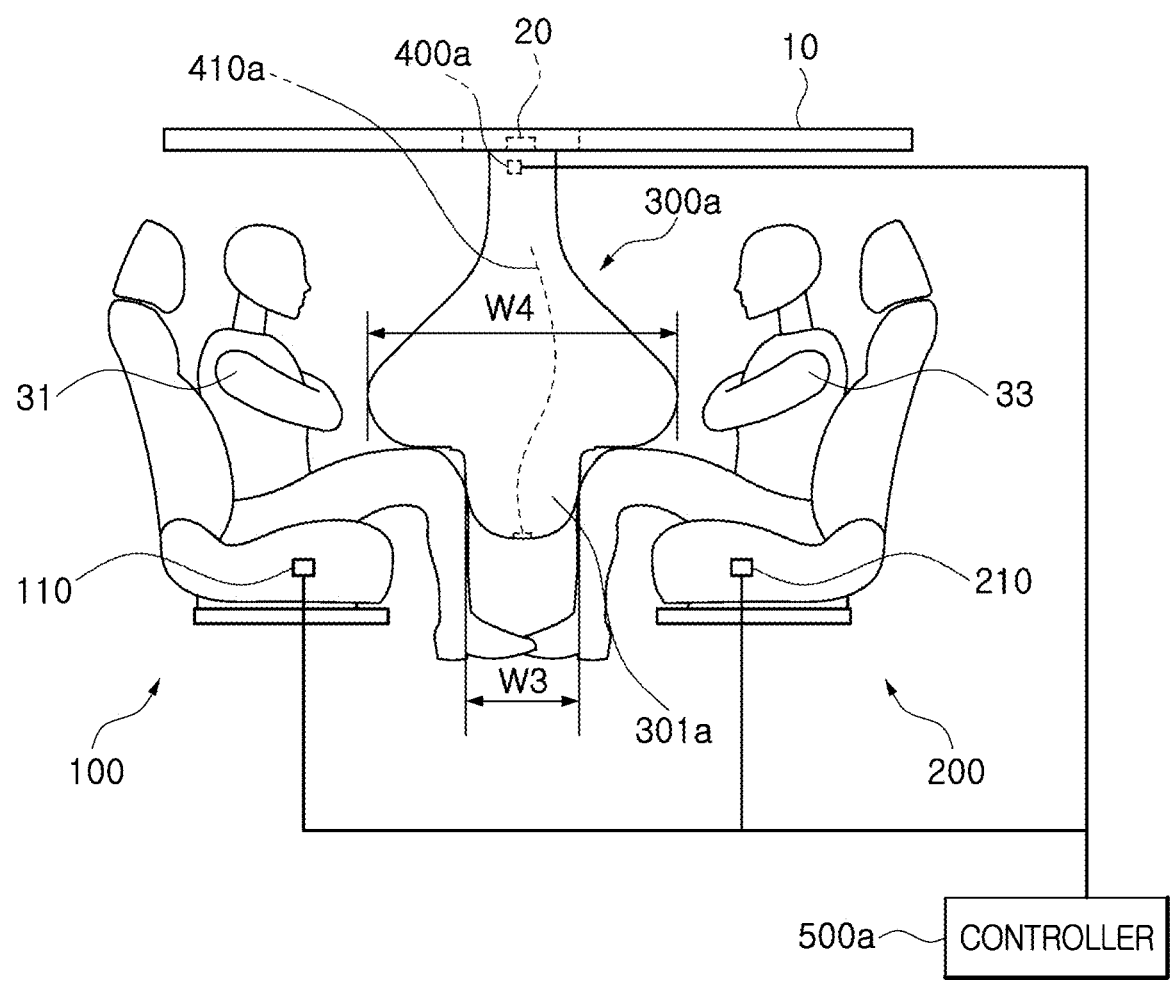
FIG. 9 is a conceptual diagram schematically illustrating the roof airbag apparatus according to another exemplary embodiment of the present disclosure.
Figure 10:
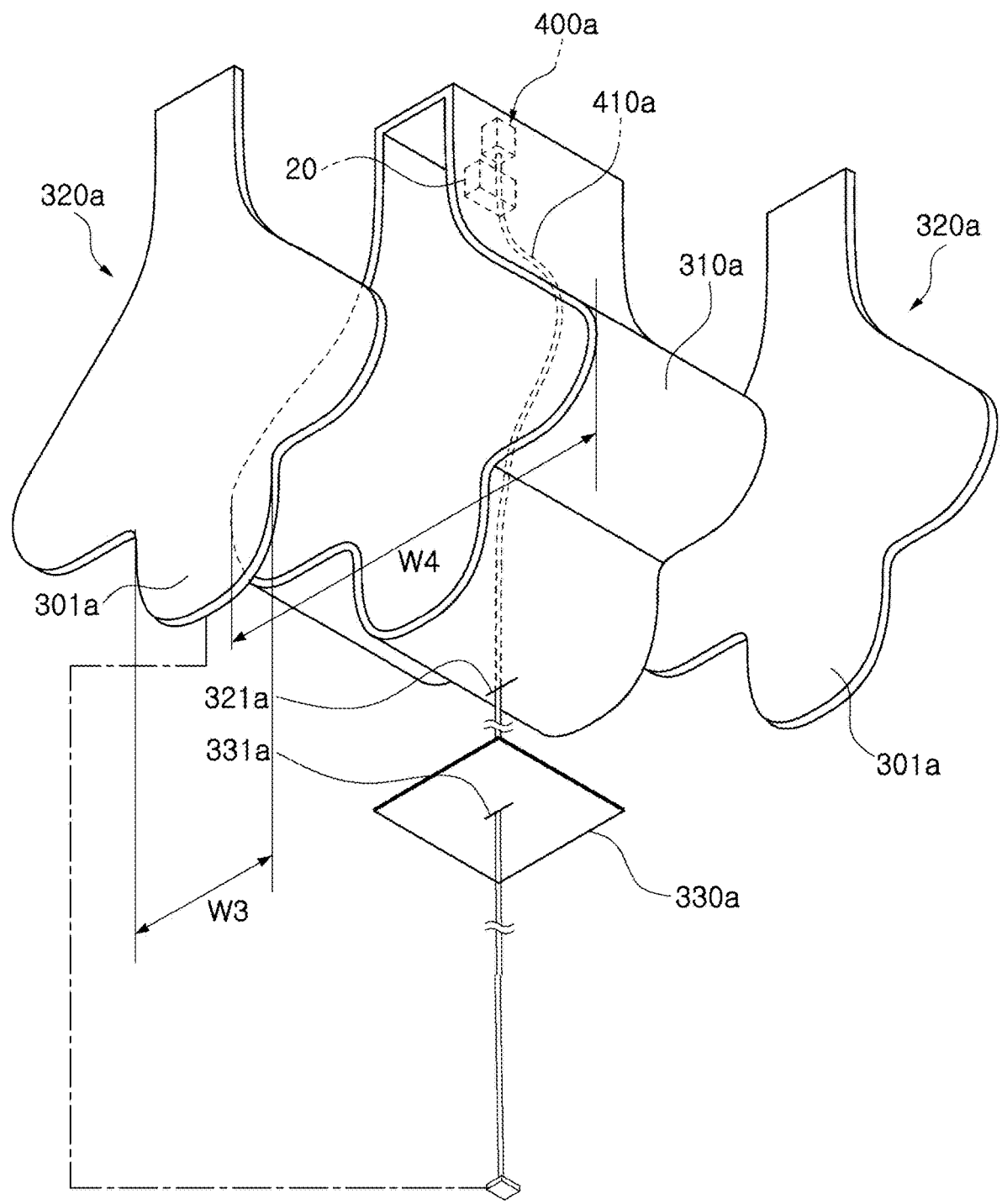
FIG. 10 is an assembly perspective diagram schematically illustrating the roof airbag apparatus according to another exemplary embodiment of the present disclosure.
Figure 11:
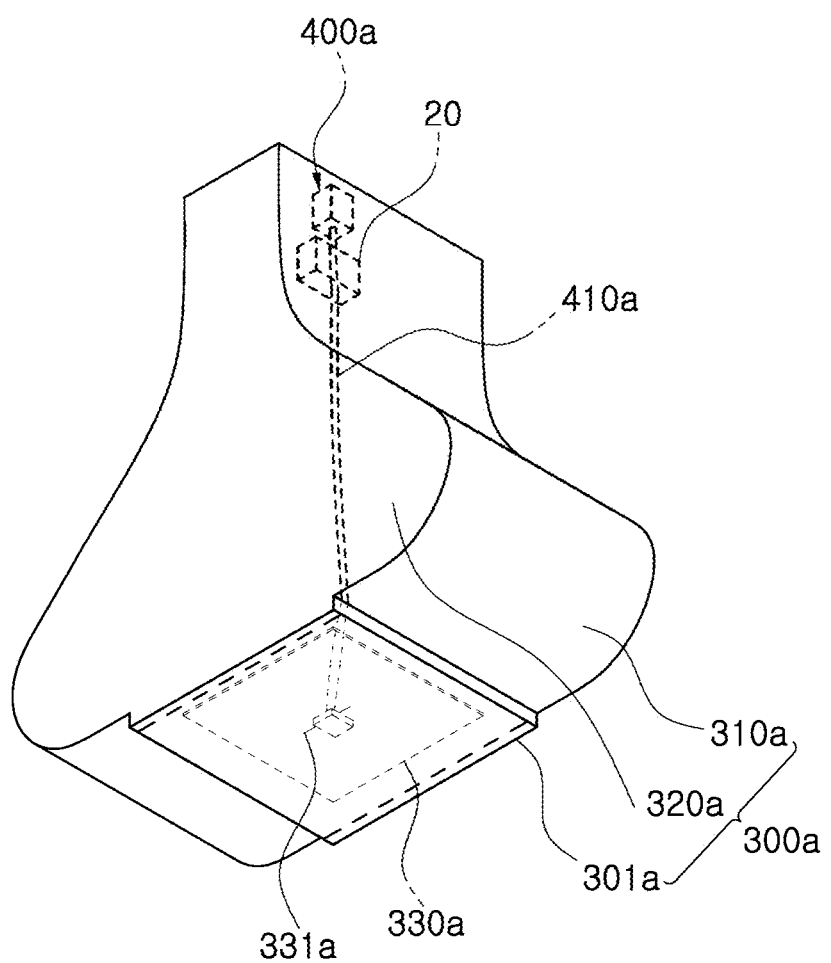
FIG. 11 is a bottom perspective diagram schematically illustrating the roof airbag apparatus according to another exemplary embodiment of the present disclosure.
Figure 12:
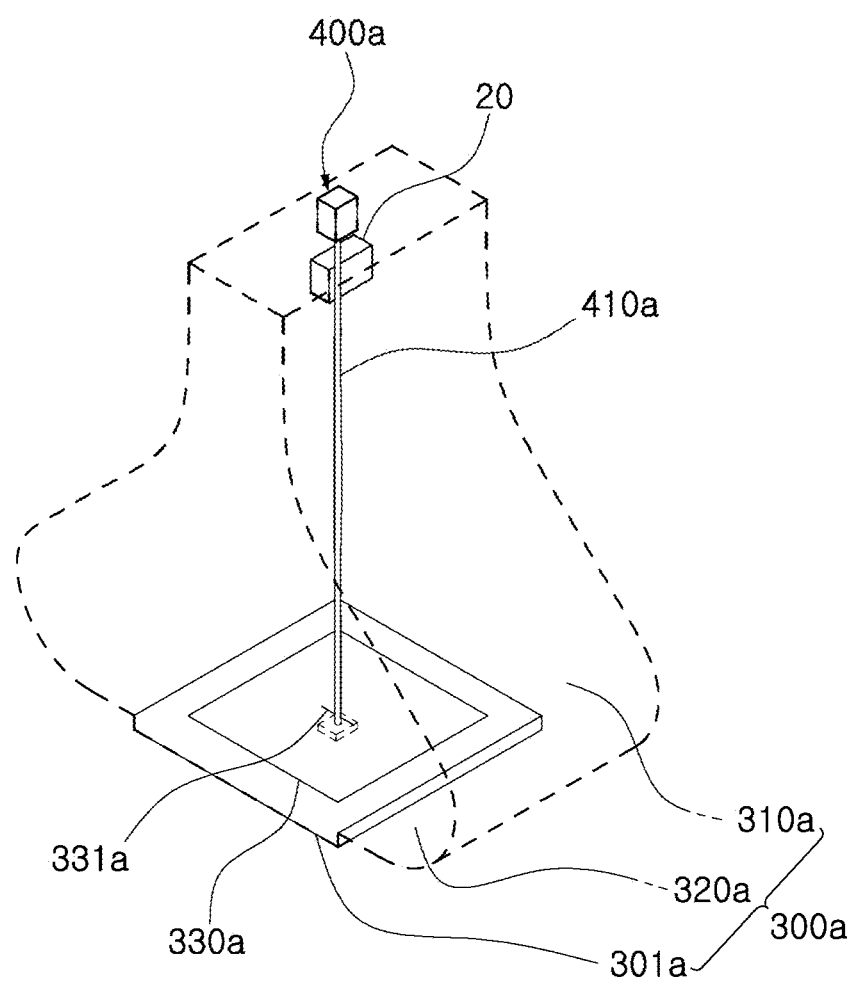
FIG. 12 is a perspective diagram schematically illustrating the roof airbag apparatus according to another exemplary embodiment of the present disclosure.
Figure 13:
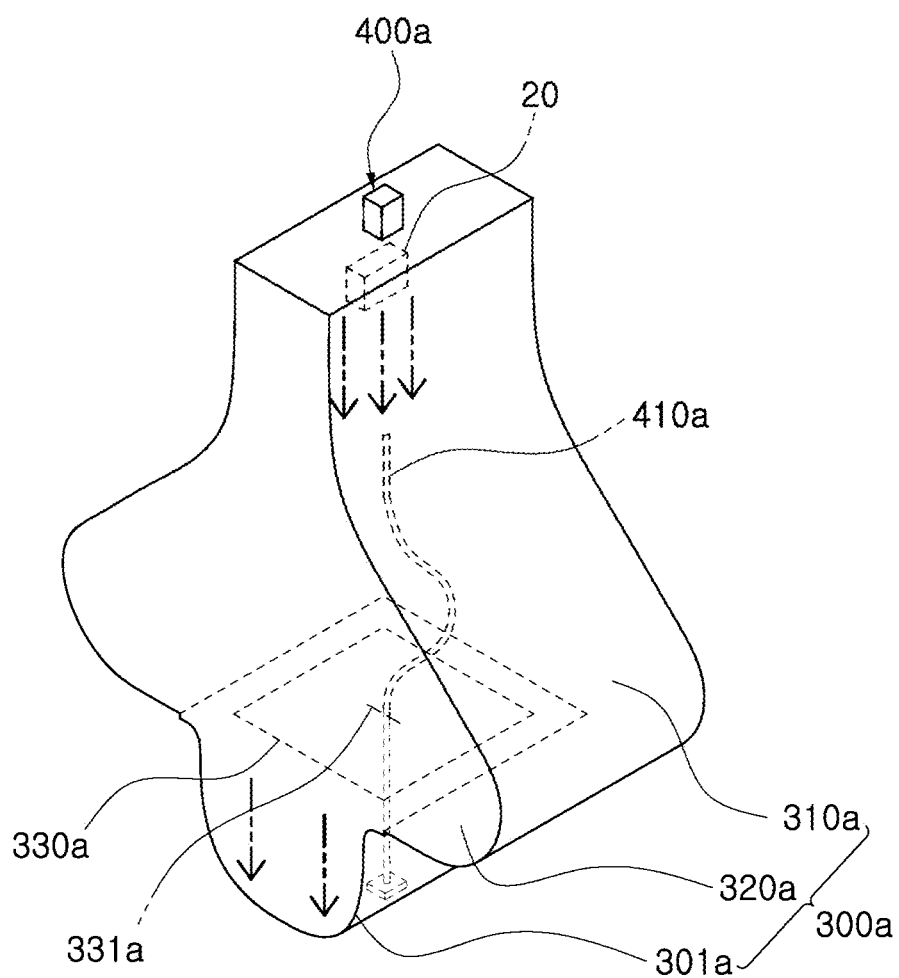
FIG. 13 is a perspective diagram schematically illustrating the deployment of an auxiliary airbag when a tether is released from a tether operation part in the roof airbag apparatus according to another exemplary embodiment of the present disclosure.

FIG. 1 is a conceptual diagram schematically illustrating a roof airbag apparatus according to an exemplary embodiment of the present disclosure, FIG. 2 is an assembly perspective diagram schematically illustrating the roof airbag apparatus according to the exemplary embodiment of the present disclosure, FIG. 3 is a bottom perspective diagram schematically illustrating the roof airbag apparatus according to the exemplary embodiment of the present disclosure, FIG. 4 is a perspective diagram schematically illustrating the roof airbag apparatus according to the exemplary embodiment of the present disclosure, FIG. 5 is a perspective diagram schematically illustrating the deployment of an auxiliary airbag when a tether is released from a tether operation part in the roof airbag apparatus according to the exemplary embodiment of the present disclosure, FIG. 6 is a conceptual diagram schematically illustrating that passengers are seated facing each other in a vehicle to which the roof airbag apparatus according to the exemplary embodiment of the present disclosure is mounted, FIG. 7 is an operational diagram schematically illustrating that an airbag main body is deployed in the roof airbag apparatus according to the exemplary embodiment of the present disclosure, FIG. 8 is an operational diagram schematically illustrating that the auxiliary airbag is deployed in the roof airbag apparatus according to the exemplary embodiment of the present disclosure, FIG. 9 is a conceptual diagram schematically illustrating the roof airbag apparatus according to another exemplary embodiment of the present disclosure, FIG. 10 is an assembly perspective diagram schematically illustrating the roof airbag apparatus according to another exemplary embodiment of the present disclosure, FIG. 11 is a bottom perspective diagram schematically illustrating the roof airbag apparatus according to another exemplary embodiment of the present disclosure, FIG. 12 is a perspective diagram schematically illustrating the roof airbag apparatus according to another exemplary embodiment of the present disclosure, and FIG. 13 is a perspective diagram schematically illustrating the deployment of an auxiliary airbag when a tether is released from a tether operation part in the roof airbag apparatus according to another exemplary embodiment of the present disclosure.

Referring to FIGS. 1 to 8, a roof airbag apparatus according to an exemplary embodiment of the present disclosure includes a first seat 100, a second seat 200, an airbag main body 300, an auxiliary airbag 600, a tether operation part 400, and a controller 500.

The first seat 100 is disposed at one side (a left in FIG. 1) of a vehicle, and has a first sensor 110 which senses whether a first passenger 31 is seated.

The second seat 200 is disposed to face the first seat 100, is disposed at the other side (a right in FIG. 1) of the vehicle, and has a second sensor 210 which senses whether a second passenger 33 is seated.

In the present disclosure, the first seat 100 and the second seat 200 are movably mounted in an autonomous traveling vehicle, and the locations or postures thereof may be changed by the first passenger 31 or the second passenger 33.

The first sensor 110 and the second sensor 210 may sense a separation distance between the first seat 100 and the second seat 200 as well as sensing whether the passengers 31, 33 are seated, respectively.

The airbag main body 300 is deployed between the first seat 100 and the second seat 200 downward from a roof 10 of the vehicle by the gas generated in an inflator part 20 when the vehicle collides. The airbag main body 300 is provided with a main communication part 310 through which the gas of the inflator part 20 may be discharged as the auxiliary airbag 600. The main communication part 310 may be formed of a slit or a hole.

The roof 10 means the ceiling of the vehicle. The inflator part 20 is mounted to the roof 10 or the airbag main body 300, and supplies gas to the airbag main body 300 by ejecting the gas when an accident such as collision or forward collision of the vehicle occurs. The airbag main body 300 is deployed downward from the roof 10 by the gas of the inflator part 20.

The auxiliary airbag 600 is selectively deployed under the airbag main body 300. The auxiliary airbag 600 is connected to the tether operation part 400 through a tether 410, and deployed downward from the airbag main body 300 when the connection with the tether 410 is released.

The tether operation part 400 is mounted inside the airbag main body 300, has one end (a bottom in FIG. 2) connected to the other end (a top in FIG. 2) of the tether 410 connected to the auxiliary airbag 600, and the connection with the tether 410 may be released. The tether operation part 400 is operated by a signal of the controller 500. That is, the tether operation part 400 operates to release the connection with the tether 410 according to the signal of the controller 500.

The controller 500 receives information measured by the first sensor 110 and the second sensor 210, and controls whether the tether operation part 400 releases the connection with the tether 410. The information measured by the first sensor 100 and the second sensor 210 includes information about whether the first passenger 31 and the second passenger 33 are seated on the first seat 100 and the second seat 200, respectively, and information about the separation distance between the first seat 100 and the second seat 200.

The controller 500 controls the tether operation part 400 to release the connection with the tether 410, when the passengers 31, 33 are seated on the first seat 100 and the second seat 200, respectively, and the separation distance between the first seat 100 and the second seat 200 is a set distance or more.

When the tether operation part 400 releases the connection with the tether 410, the auxiliary airbag 600 is deployed downward from the airbag main body 300, and set to be deployed between the knees of the first passenger 31 and the knees of the second passenger 33. The auxiliary airbag 600 is deployed between the knees of the first passenger 31 and the knees of the second passenger 33 to be supported by the knees of the first passenger 31 and the knees of the second passenger 33.

Accordingly, the auxiliary airbag 600 may prevent the airbag main body 300 from being moved to the left and right (in FIG. 1), and the airbag main body 300 may protect the passengers 31, 33 facing each other from the external collision, and the collision between the passengers 31, 33.

In addition, the passengers 31, 33 may be protected from objects flying from the interior of the vehicle by the airbag main body 300 when the accident occurs. In addition, the knees of the first passenger 31 and the second passenger 33 may be protected by the auxiliary airbag 600.

The lower side of the airbag main body 300 is deployed downward from the roof 10, and deployed toward the first seat 100 and the second seat 200 compared to the upper side of the airbag main body 300. The airbag main body 300 has the lower side which is deployed wider than the upper side of the airbag main body 300, so that the passengers 31, 33 may be protected by the airbag main body 300 while the upper bodies of the passengers 31, 33 are bent when the collision or forward collision of the vehicle occurs (see FIG. 8).

A maximum width W1 in which the auxiliary airbag 600 is deployed toward the first seat 100 and the second seat 200 is formed smaller than a maximum width W2 in which the airbag main body 300 is deployed toward the first seat 100 and the second seat 200. The maximum deployment width W1 of the auxiliary airbag 600 is formed smaller than the maximum deployment width W2 of the airbag main body 300, and thus the auxiliary airbag 600 may be deployed between the knees of the first passenger 31 and the second passenger 33 facing each other.

The roof airbag apparatus according to the exemplary embodiment of the present disclosure further includes a diaphragm part 700. The diaphragm part 700 is disposed between the airbag main body 300 and the auxiliary airbag 600, and limits the gas transfer of the inflator part 20 from the airbag main body 300 to the auxiliary airbag 600.

The diaphragm part 700 may be disposed between the airbag main body 300 and the auxiliary airbag 600, thereby restricting the gas having inflated the airbag main body 300 from being discharged to the auxiliary airbag 600, if the tether operation part 400 does not release the connection between the tether 410 and the auxiliary airbag 600. The diaphragm part 700 may not completely block the gas of the inflator part 20 from being discharged to the auxiliary airbag 600, but may restrict the gas from being supplied to the entire surface.

The diaphragm part 700 is formed with a communication part 710 through which the gas of the inflator part 20 is discharged from the airbag main body 300 to the auxiliary airbag 600. The communication part 710 may be formed of a slit or a hole. The communication part 710 may be disposed at the same location as the main communication part 310 of the airbag main body 300, or may be staggered.

The tether 410 is connected to the auxiliary airbag 600 through the communication part 710. The deployment of the auxiliary airbag 600 is restricted in a state where the tether 410 connected to the auxiliary airbag 600 is connected to the tether operation part 400.

In the present disclosure, the auxiliary airbag 600 accommodates the diaphragm part 700, and is sealed and fixed to the airbag main body 300 with a separate material. That is, each of the airbag main body 300, the diaphragm part 700, and the auxiliary airbag 600 is made of a separate material and sealed to form an integral body.

The controller 500 receives the information indicating that the first passenger 31 and the second passenger 33 are seated on the first seat 100 and the second seat 200, respectively, and the separation information between the first seat 100 and the second seat 200 from the first sensor 110 and the second sensor 210. The controller 500 controls whether the tether operation part 400 releases the connection with the tether 410 by the information received from the first sensor 110 and the second sensor 210.

The tether operation part 400 releases the connection with the tether 410 when the first seat 100 and the second seat 200 are spaced apart from each other by a set distance or more.

In the present disclosure, the controller 500 controls the auxiliary airbag 600 to be deployed by allowing the tether operation part 400 to release the connection with the tether 410 when the first passenger 31 and the second passenger 33 are seated facing each other on the first seat 100 and the second seat 200, respectively and the first seat 100 and the second seat 200 are spaced apart from each other by the set distance or more.

When the first passenger 31 and the second passenger 33 are spaced apart from each other by the set distance or more by the first seat 100 and the second seat 200, the airbag main body 300 may be moved when the collision or forward collision of the vehicle occurs, but the auxiliary airbag 600 may be supported by the knees of the first passenger 31 and the second passenger 33, thereby protecting the passengers 31, 33 while preventing the movement of the airbag main body 300.

An operation of the roof airbag apparatus according to the present disclosure will be described with reference to FIGS. 6 and 8. Referring to FIG. 6, the locations or postures of the first seat 100 and the second seat 200 in an autonomous traveling vehicle may be changed according to the selections of the first passenger 31 and the second passenger 33, respectively. FIG. 6 illustrates a case where the first passenger 31 and the second passenger 33 are seated facing each other on the first seat 100 and the second seat 200, respectively.

The first sensor 110 mounted to the first seat 100 and the second sensor 210 mounted to the second seat 200 measure whether the passengers 31, 33 are seated, whether the passengers 31, 33 face each other, and the distance between the passengers 31, 33, and transfer this information to the controller 500.

The airbag main body 300, the tether operation part 400, and the auxiliary airbag 600 are embedded in the roof 10 before the vehicle accident occurs.

Referring to FIG. 7, when an accident such as the collision or forward collision of the vehicle occurs, gas is generated from the inflator unit 20 and the airbag main body 300 is deployed downward from the roof 10.

The airbag main body 300 may be deployed to prevent the collision between the passengers 31, 33. Here, when the distance between the first passenger 31 and the second passenger 33 in the information measured by the first sensor 110 and the second sensor 210 is less than a set distance, the controller 500 controls the tether operation part (400) not to release the connection of the tether 410 connected to the auxiliary airbag 500. Accordingly, the deployment of the auxiliary airbag 600 is restricted by the tether 410.

Referring to FIG. 8, when the distance between the first passenger 31 and the second passenger 33 in the information measured by the first sensor 110 and the second sensor 210 is the set distance or more, the tether operation part 400 releases the connection of the tether 410 connected to the auxiliary airbag 600. FIG. 8 illustrates the occurrence of the vehicle accident from the rear side (rightward in FIG. 8).

The auxiliary airbag 600 is released from the restriction by the tether 410, and the gas of the inflator part 20 introduced into the airbag main body 300 is introduced into the auxiliary airbag 600. The auxiliary airbag 600 is deployed between the knees of the first passenger 31 and the second passenger 33 facing each other.

Since the auxiliary airbag 600 is deployed between the knees of the first passenger 31 and the second passenger 33 facing each other and supported by the knees of the first passenger 31 and the second passenger 33, the airbag main body 300 may be prevented from being moved between the first passenger 31 and the second passenger 33 spaced apart from each other. Accordingly, by the airbag main body 300 and the auxiliary airbag 600, it is possible to prevent the collision between the passengers 31, 33, and to protect the passengers 31, 33 from objects such as a mobile phone and a book moving in the vehicle.

A roof airbag apparatus according to another exemplary embodiment of the present disclosure will be described with reference to FIGS. 9 to 13.

The roof airbag apparatus according to another exemplary embodiment of the present disclosure includes the first seat 100, the second seat 200, an airbag main body 300*a*, a tether operation part 400*a*, and a controller 500*a*. In another exemplary embodiment of the present disclosure, the structures and operations of the roof 10, the inflator part 20, the first seat 100, and the second seat 200 are replaced with the aforementioned descriptions in the roof airbag apparatus according to the exemplary embodiment of the present disclosure.

The airbag main body 300*a* is deployed between the first seat 100 and the second seat 200 below the roof 10 of the vehicle by the gas generated in the inflator part 20 when the vehicle collides. The airbag main body 300*a* has the auxiliary airbag 301*a* which is formed at the lower side of the airbag main body 300*a*, and deployed downward from the airbag main body 301*a*, when the tether operation part 400 releases the connection with the tether 410.

The tether operation part 400*a* is mounted inside the airbag main body 300*a*, and has one end (a lower end in FIG. 10) connected to the other end (an upper end in FIG. 10) of the tether 410 connected to the lower side of the airbag main body 300*a*. The tether operation part 400*a* may release the connection with the tether 410*a* by a signal of the controller 500*a*.

The controller 500*a* receives information measured by the first sensor 110 and the second sensor 210, and controls whether the tether operation part 400a releases the connection with the tether 410a. The information measured by the first sensor 110 and the second sensor 210 includes information about whether the first passenger 31 and the second passenger 33 are seated on the first seat 100 and the second seat 200, respectively, and information about the separation distance between the first seat 100 and the second seat 200.

The controller 500a controls the tether operation part 400a to release the connection with the tether 410a, when the passengers 31, 33 are seated on the first seat 100 and the second seat 200, respectively and the separation distance between the first seat 100 and the second seat 200 is the set distance or more.

The lower side of the airbag main body 300a is deployed downward from the roof 10, and deployed toward the first seat 100 and the second seat 200 compared to the upper side of the airbag main body 300a. The airbag main body 300a has the lower side which is deployed wider than the upper side of the airbag main body 300a, so that the passengers 31, 33 may be protected by the airbag main body 300a while the upper bodies of the passengers 31, 33 are bent when the collision or forward collision of the vehicle occurs (see FIG. 8).

A maximum width W3 in which the auxiliary airbag 301a is deployed toward the first seat 100 and the second seat 200 is formed smaller than a maximum width (W4) in which the airbag main body 300a is deployed toward the first seat 100 and the second seat 200. The maximum deployment width W3 of the auxiliary airbag 301a is formed smaller than the maximum deployment width W4 of the airbag main body 300a, and thus the auxiliary airbag 301a may be deployed between the knees of the first passenger 31 and the second passenger 33 facing each other.

The airbag main body 300a includes a main cushion part 310a and one or more side cushions 320a. The main cushion part 310a is equipped with the tether operation part 400a, and is inflated toward the first seat 100 and the second seat 200. The main cushion part 310a is provided with a main communication part 321a through which the gas of the inflator part 20 may be discharged to the auxiliary airbag 301a. The main communication part 321a may be formed of a slit or a hole.

The side cushions 320a are mounted on the opened one surface (the front in FIG. 10) and the opened other surface (the rear in FIG. 10) of the main cushion part 310a, respectively, and have the auxiliary airbag 301a at one side (the lower side in FIG. 10).

The airbag main body 300a further includes a diaphragm part 330a. The diaphragm part 330a is disposed between the main cushion part 310a and the auxiliary air bag 301a, and restricts a gas transfer of the inflator part 20 from the main cushion part 310a to the auxiliary air bag 301a.

The diaphragm part 330a may be disposed between the main cushion part 310a and the auxiliary airbag 301a, thereby restricting the gas having inflated the main cushion part 310a and the side cushions 320a from being discharged to the auxiliary airbag 301a, if the tether operation part 400a does not release the connection between the tether 410a and the auxiliary airbag 301a. The diaphragm part 330a may not completely block the gas of the inflator part 20 from being discharged to the auxiliary airbag 301a, but may restrict the gas from being supplied to the entire surface.

The diaphragm part 330a is formed with a communication part 331a through which the gas from the inflator part 20 is discharged from the main cushion part 310a to the auxiliary airbag 301a. The communication part 331a may be formed of a slit or a hole. The communication part 331a may be disposed at the same location as the main communication part 320a of the main cushion part 310a, or may be staggered.

The tether 410a is connected to the auxiliary airbag 301a through the communication part 331a. The deployment of the auxiliary airbag 301a is restricted in a state where the tether 410a connected to the auxiliary airbag 301a is connected to the tether operation part 400a.

The controller 500a receives the information indicating that the first passenger 31 and the second passenger 33 are seated on the first seat 100 and the second seat 200, respectively, and the separation information between the first seat 100 and the second seat 200 from the first sensor 110 and the second sensor 210, and controls whether the tether operation part 400a releases the connection with the tether 410a.

The tether operation part 400a releases the connection with the tether 410a when the first seat 100 and the second seat 200 are spaced apart from each other by the set distance or more.

In the present disclosure, the controller 500a deploys the auxiliary airbag 301a by allowing the tether operation part 400a to release the connection with the tether 410a when the first passenger 31 and the second passenger 33 are seated facing each other on the first seat 100 and the second seat 200 and the first seat 100 and the second seat 200 are spaced apart from each other by the set distance or more.

When the first passenger 31 and the second passenger 33 are spaced apart from each other by the set distance or more by the first seat 100 and the second seat 200, the airbag main body 300a may be moved when the collision or forward collision of the vehicle occurs, but the auxiliary airbag 301a may be supported by the knees of the first passenger 31 and the second passenger 33, thereby protecting the passengers 31, 33 while preventing the movement of the airbag main body 300a.

An operation of the roof airbag apparatus according to another exemplary embodiment of the present disclosure is replaced with the description of the aforementioned operation of the roof airbag apparatus according to the exemplary embodiment of the present disclosure.

According to the roof airbag apparatus according to the present disclosure, the airbag main body and the auxiliary airbag may be deployed between the passengers who are seated facing each other in the autonomous traveling vehicle, thereby reducing the injury caused by the collision between the passengers.

In addition, according to the present disclosure, the airbag main body and the auxiliary airbag may be deployed between the passengers who are seated facing each other in the autonomous traveling vehicle, thereby protecting the passengers from the objects flying to the fronts of the passengers.

In addition, according to the present disclosure, the auxiliary airbag deployed downward from the airbag main body between the passengers who are seated facing each other may be deployed between the passengers who are seated facing each other, thereby improving passenger protection performance while minimizing the movement of the airbag main body.

Although the present disclosure has been described with reference to the exemplary embodiment illustrated in the drawings, this is only exemplary, and those skilled in the art to which the present disclosure pertains will understand that various modifications and equivalent other exemplary embodiments therefrom are possible. Accordingly, the true technical protection scope of the present disclosure will be defined by the appended claims.

What is claimed is:

1. A roof airbag apparatus comprising:
a first seat which has a first sensor sensing whether a first passenger is seated;
a second seat which is disposed to face the first seat, and has a second sensor sensing whether a second passenger is seated;
an airbag main body which is deployed between the first seat and the second seat downward from a roof of a vehicle by gas generated from an inflator part when the vehicle collides;
an auxiliary airbag which is deployed downward from the airbag main body;
a tether operation part which is mounted inside the airbag main body, has one end connected to a tether connected to the auxiliary airbag, and releases the connection with the tether; and
a controller which receives information measured by the first sensor and the second sensor, and controls whether the tether operation part releases the connection with the tether.

2. The roof airbag apparatus of claim 1,
wherein the auxiliary airbag is deployed, when the tether operation part releases the connection with the tether.

3. The roof airbag apparatus of claim 1,
wherein a lower side of the airbag main body is deployed toward the first seat and the second seat compared to an upper side of the airbag main body, while being deployed downward from the roof.

4. The roof airbag apparatus of claim 1,
wherein a maximum width at which the auxiliary airbag is deployed toward the first seat and the second seat is formed smaller than a maximum width at which the airbag main body is deployed toward the first seat and the second seat.

5. The roof airbag apparatus of claim 1, further comprising:
a diaphragm part which is disposed between the airbag main body and the auxiliary airbag, and restricts a gas transfer of the inflator part from the airbag main body to the auxiliary airbag.

6. The roof airbag apparatus of claim 5,
wherein the diaphragm part is formed with a communication part through which the gas of the inflator part is discharged from the airbag main body to the auxiliary airbag.

7. The roof airbag apparatus of claim 6,
wherein the tether is connected to the auxiliary airbag through the communication part.

8. The roof airbag apparatus of claim 5,
wherein the auxiliary airbag accommodates the diaphragm part, and is sealed and fixed to the airbag main body with a separate material.

9. The roof airbag apparatus of claim 1,
wherein the controller receives information indicating that the first passenger and the second passenger are seated on the first seat and the second seat, respectively, and separation information between the first seat and the second seat from the first sensor and the second sensor, and allows the tether operation part to release the tether.

10. The roof airbag apparatus of claim 9,
wherein the tether operation part releases the connection with the tether when the first seat and the second seat are spaced apart from each other by a set distance or more.

11. A roof airbag apparatus comprising:
a first seat which has a first sensor sensing whether a first passenger is seated;
a second seat which is disposed to face the first seat, and has a second sensor sensing whether a second passenger is seated;
an airbag main body which is deployed between the first seat and the second seat downward from a roof of a vehicle by gas generated from an inflator part when the vehicle collides;
a tether operation part which is mounted inside the airbag main body, has one end connected to a tether connected to the lower side of the airbag main body, and releases the connection with the tether; and
a controller which receives information measured by the first sensor and the second sensor, and controls whether the tether operation part releases the connection with the tether,
wherein the airbag main body has an auxiliary airbag which is formed at the lower side of the airbag main body, and is deployed downward from the airbag main body, when the tether operation part releases the connection with the tether.

12. The roof airbag apparatus of claim 11,
wherein a lower side of the airbag main body is deployed toward the first seat and the second seat compared to an upper side of the airbag main body, while being deployed downward from the roof.

13. The roof airbag apparatus of claim 12,
wherein a maximum width at which the auxiliary airbag is deployed toward the first seat and the second seat is formed smaller than a maximum width at which the airbag main body is deployed toward the first seat and the second seat.

14. The roof airbag apparatus of claim 11,
wherein the airbag main body comprises:
a main cushion part which is mounted with the tether operation part, and inflated toward the first seat and the second seat; and
one or more side cushions which are mounted to one surface and the other surface of the main cushion part which are opened, respectively, and have the auxiliary airbag at one side thereof.

15. The roof airbag apparatus of claim 14,
wherein the airbag main body further comprises:
a diaphragm part which is disposed between the main cushion part and the auxiliary airbag, and restricts a gas transfer of the inflator part from the main cushion part to the auxiliary airbag.

16. The roof airbag apparatus of claim 15,
wherein the diaphragm part is formed with a communication part through which the gas of the inflator part is discharged from the main cushion part to the auxiliary airbag.

17. The roof airbag apparatus of claim 16,
wherein the tether is connected to the auxiliary airbag through the communication part.

18. The roof airbag apparatus of claim 11,
wherein the controller receives information indicating that the first passenger and the second passenger are seated on the first seat and the second seat, respectively, and separation information between the first seat and the second seat from the first sensor and the second sensor, and allows the tether operation part to release the tether.

19. The roof airbag apparatus of claim 18,
wherein the tether operation part releases the connection with the tether when the first seat and the second seat are spaced apart from each other by a set distance or more.

\* \* \* \* \*